(12) United States Patent
Bätzgen et al.

(10) Patent No.: US 10,118,984 B2
(45) Date of Patent: Nov. 6, 2018

(54) SILYLATED POLYURETHANES, THEIR PREPARATION AND USE

(71) Applicant: Henkel AG & Co. KGaA, Duesseldorf (DE)

(72) Inventors: Ralf Bätzgen, Duesseldorf (DE); Jan-Erik Damke, Duesseldorf (DE); David Briers, Hasselt (BE); Johann Klein, Duesseldorf (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 15/697,499

(22) Filed: Sep. 7, 2017

(65) Prior Publication Data

US 2017/0362371 A1 Dec. 21, 2017

Related U.S. Application Data

(63) Continuation of application No. PCT/EP2016/055005, filed on Mar. 9, 2016.

(30) Foreign Application Priority Data

Mar. 11, 2015 (EP) .................... 15158615

(51) Int. Cl.
| | | |
|---|---|---|
| C08G 18/10 | (2006.01) | |
| C08G 18/79 | (2006.01) | |
| C08G 18/48 | (2006.01) | |
| C08G 18/22 | (2006.01) | |
| C08G 18/71 | (2006.01) | |

(52) U.S. Cl.
CPC .......... *C08G 18/10* (2013.01); *C08G 18/227* (2013.01); *C08G 18/4825* (2013.01); *C08G 18/718* (2013.01); *C08G 18/792* (2013.01)

(58) Field of Classification Search
None
See application file for complete search history.

(56) References Cited

U.S. PATENT DOCUMENTS

| | | | |
|---|---|---|---|
| 3,632,557 A | 1/1972 | Brode et al. | |
| 3,971,751 A | 7/1976 | Isayama et al. | |
| 3,979,344 A | 9/1976 | Bryant et al. | |
| 4,222,925 A | 9/1980 | Bryant et al. | |
| 4,960,844 A | 10/1990 | Singh | |
| 5,990,257 A | 11/1999 | Johnston et al. | |
| 6,008,305 A * | 12/1999 | Wang ................. | C08G 18/0885 525/437 |
| 6,060,560 A * | 5/2000 | St. Clair ................ | C08G 18/10 525/124 |
| 6,124,387 A | 9/2000 | Wang et al. | |
| 6,545,087 B1 | 4/2003 | Schmalstieg et al. | |
| 8,431,675 B2 | 4/2013 | Braun et al. | |
| 8,834,670 B2 * | 9/2014 | Ha ....................... | C08G 18/672 156/331.4 |
| 8,993,706 B2 | 3/2015 | Schubert et al. | |
| 9,572,868 B2 | 2/2017 | Schoenberger et al. | |
| 2003/0105263 A1 * | 6/2003 | Fan .................... | C08G 18/0823 528/30 |
| 2007/0100108 A1 * | 5/2007 | Huang ................. | C08G 18/10 528/29 |
| 2010/0317796 A1 * | 12/2010 | Huang ................. | C08G 18/10 524/588 |
| 2011/0034628 A1 * | 2/2011 | Ott ..................... | C08G 18/0823 524/590 |
| 2011/0071254 A1 | 3/2011 | Bachon et al. | |
| 2011/0155320 A1 * | 6/2011 | Kramer ................ | C07F 7/1836 156/330 |
| 2013/0303804 A1 * | 11/2013 | Walther ............. | C08G 18/2865 564/63 |
| 2015/0031806 A1 | 1/2015 | Lim et al. | |
| 2015/0274918 A1 * | 10/2015 | Kocher ................ | C08L 101/10 521/97 |
| 2015/0284499 A1 * | 10/2015 | Kocher .............. | C08G 18/4887 521/131 |

FOREIGN PATENT DOCUMENTS

| | | | | |
|---|---|---|---|---|
| CN | 104327245 | * | 2/2015 | ............. C08G 18/83 |
| DE | 4029504 A1 | | 3/1992 | |
| DE | 19849817 A1 | | 5/2000 | |
| DE | 102008020980 A1 | | 10/2009 | |
| EP | 0520426 A1 | | 12/1992 | |
| EP | 2289972 A1 | | 3/2011 | |
| WO | 2009071542 A1 | | 6/2009 | |
| WO | 2013045403 A1 | | 4/2013 | |

OTHER PUBLICATIONS

Machine translation of CN 104327245, 3 pages, translation generated Sep. 2017 (Year: 2017).*
International Search Report for International PCT Patent Application No. PCT/EP2016/055005 dated May 25, 2016.

* cited by examiner

*Primary Examiner* — Robert S Loewe
(74) *Attorney, Agent, or Firm* — James E. Piotrowski

(57) ABSTRACT

A silylated polyurethane obtainable by a process comprising the following steps: (a) reacting at least one polyol with at least one triisocyanate to form a hydroxyl-terminated polyurethane prepolymer, and (b) reacting said polyurethane prepolymer with at least one isocyanatosilane of the formula (1): OCN—R—Si—$(X)_m(R^1)_{3-m}$, wherein m is 0, 1 or 2, each $R^1$ is independently from each other a hydroxyl group, an alkoxy group having 1 to 10 carbon atoms, an acyloxy group having 1 to 10 carbon atoms, or —$OCH(R^2)COOR^3$, wherein $R^2$ is hydrogen or an alkyl group having 1 to 4 carbon atoms and $R^3$ is a straight-chain or branched alkyl group having 1 to 8 carbon atoms, each X is independently from each other and optionally substituted hydrocarbon group having 1 to 10 carbon atoms, which can be interrupted by at least one heteroatom, and R is a difunctional organic group, to endcap the hydroxyl groups on said prepolymer with said isocyanatosilane. The silylated polyurethanes are suitable for use in a preparation as an adhesive, sealant, or coating agent.

9 Claims, No Drawings

SILYLATED POLYURETHANES, THEIR PREPARATION AND USE

The present invention relates to silylated polyurethanes, their preparation and their use in adhesives, sealants, and in coating compositions.

Polymer systems that possess reactive alkoxysilyl groups are known. In the presence of atmospheric moisture these alkoxysilane-terminated polymers are capable, already at room temperature, of condensing with one another with release of the alkoxy groups. What forms in this context, depending on the concentration of alkoxysilyl groups and their configuration, are principally long-chain polymers (thermoplastics), relatively wide-mesh three-dimensional networks (elastomers), or highly crosslinked systems (thermosetting plastics).

The polymers generally comprise an organic backbone that carries alkoxysilyl groups at the ends. The organic backbone can involve, for example, polyurethanes, polyesters, polyethers, etc.

One-component, moisture-curing adhesives and sealants have played for years a significant role in numerous technical applications. In addition to the polyurethane adhesives and sealants having free isocyanate groups, and the traditional silicone adhesives and sealants based on dimethylpolysiloxanes, the so-called modified silane adhesives and sealants have also been increasingly used recently. In this latter group, the main constituent of the polymer backbone is a polyether, and the reactive and crosslinkable terminal groups are alkoxysilyl groups. The modified silane adhesives and sealants have the advantage, as compared with the polyurethane adhesives and sealants, of being free of isocyanate groups, in particular of monomeric diisocyanates; they are also notable for a broad adhesion spectrum to a plurality of substrates without surface pretreatment using primers.

U.S. Pat. Nos. 4,222,925 A and 3,979,344 A describe siloxane-terminated organic sealant compositions, curable already at room temperature, based on reaction products of isocyanate-terminated polyurethane prepolymers with 3-aminopropyltrimethoxysilane or 2-aminoethyl- or 3-aminopropylmethoxysilane to yield isocyanate-free siloxane-terminated prepolymers. Adhesives and sealants based on these prepolymers have unsatisfactory mechanical properties, however, especially in terms of their elongation and breaking strength.

The methods set forth below for the manufacture of silane-terminated prepolymers based on polyethers have already been described:

Copolymerization of unsaturated monomers with ones that comprise alkoxysilyl groups, for example vinyltrimethoxysilane.

Grafting unsaturated monomers, such as vinyltrimethoxysilane, onto thermoplastics such as polyethylene.

Hydroxyfunctional polyethers are converted in an ether synthesis, using unsaturated chlorine compounds, e.g. allyl chloride, into polyethers having terminal olefinic double bounds, which in turn are reacted with hydrosilane compounds that have hydrolyzable groups, for example $HSi(OCH_3)_3$, in a hydrosilylation reaction under the catalytic influence of, for example, transition metal compounds of the eighth group, to yield silane-terminated polyethers.

In another method, the polyethers containing olefinically unsaturated groups are reacted with a mercaptosilane such as, for example, 3-mercaptopropyltrialkoxysilane.

In a further method, firstly hydroxyl-group-containing polyethers are reacted with di- or polyisocyanates, which are then in turn reacted with aminofunctional silanes or mercaptofunctional silanes to yield silane-terminated prepolymers.

A further possibility provides for the reaction of hydroxyfunctional polyethers with isocyanatofunctional silanes such as, for example, 3-isocyanatopropyltrimethoxysilane.

These manufacturing methods, and the use of the aforementioned silane-terminated prepolymers in adhesive/sealant applications, are recited e.g. in the following patent documents: U.S. Pat. No. 3,971,751 A, EP-A-70475, DE-A-19849817, U.S. Pat. Nos. 6,124,387 A, 5,990,257 A, 4,960,844 A, 3,979,344 A, 3,632,557 A, DE-A-4029504, EP-A-601021, or EP-A-370464.

EP 0931800 A1 describes the manufacture of silylated polyurethanes by reacting a polyol component having a terminal unsaturation of less than 0.02 meq/g with a diisocyanate to yield a hydroxyl-terminated prepolymer, and then reacting that with an isocyanatosilane of the formula OCN—R—Si—(X)$_m$(—OR$^1$)$_{3-m}$, where m is 0, 1, or 2 and each R$^1$ residue is an alkyl group having 1 to 4 carbon atoms and R is a difunctional organic group. According to the teaching of this document, such silylated polyurethanes exhibit a superior combination of mechanical properties, and cure in reasonable amounts of time to yield a low-tack sealant without exhibiting excessive viscosity.

WO 2009/071542 A1 describes a method for preparing a silylated polyurethane, comprising reacting at least one polyol compound having a molecular weight of 4,000 to 30,000 g/mol and at least one monofunctional compound with regard to isocyanates with at least one diisocyanate, in a stoichiometric excess of the sum of the polyol compound(s) and monofunctional compound(s) relative to the diisocyanate compound(s), whereby a hydroxyl-terminated polyurethane prepolymer is formed which is subsequently reacted with isocyanatosilane.

A need still exists for compositions based on silylated polyurethanes for use in adhesives and sealants that exhibit better performance, in particular, curing speed and mechanical strength after curing, and at the same time show acceptable viscosity, allowing the compositions to be easily applied. The object of the present invention is therefore to provide silylated polyurethanes and respective compositions having improved curing speed while having acceptable mechanical strength and viscosity.

The manner in which the object is achieved by the invention may be gathered from the Claims. It contains essentially of a silylated polyurethane obtainable by a process comprising the following steps:

(a) reacting at least one polyol with at least one triisocyanate to form a hydroxyl-terminated polyurethane prepolymer; and (b) reacting said polyurethane prepolymer with at least one isocyanatosilane of the formula (1)

$$OCN\text{—}R\text{—}Si\text{—}(X)_m(R^1)_{3-m} \qquad (1)$$

wherein m is 0, 1 or 2, each R$^1$ is independently from each other a hydroxyl group, an alkoxy group having 1 to 10 carbon atoms, an acyloxy group having 1 to 10 carbon atoms, or —OCH(R$^2$)COOR$^3$, wherein R$^2$ is hydrogen or an alkyl group having 1 to 4 carbon atoms and R$^3$ is a straight-chain or branched alkyl group having 1 to 8 carbon atoms, each X is independently from each other and optionally substituted hydrocarbon group having 1 to 10 carbon atoms, which can be interrupted by at least one heteroatom, and R is a difunctional organic group, to endcap the hydroxyl groups on said prepolymer with said isocyanatosilane.

According to the present invention, a hydroxyl-terminated polyurethane prepolymer is obtained by reacting at least one polyol with at least one triisocyanate.

A "polyol" is understood for purpose of the present invention as a polymer having at least two hydroxyl groups. In principle, a large number of polymers carrying at least two hydroxyl groups, such as polyester polyols, polycaprolactones, polybutadienes or polyisoprenes as well as hydrogenation products thereof, or also polyacrylates or polymethacrylates, can be used as polyol compounds. Mixtures of different polyol compounds can also be used.

According to the present invention, a polyether polyol is preferably used as the polyol. A "polyether" is understood for purpose of the present invention as a polymer whose repeating unit contains ether functionalities C—O—C in the main chain. Polymers having lateral ether groups, such as cellulose ethers, starch ethers, and vinyl ether polymers, as well as polyacetals, are therefore not covered by this definition.

Polymers which contain polyethers as backbone have a flexible and elastic structure with which compositions that have outstanding elastic properties can be manufactured. Polyethers are not only flexible in their backbone, but also strong at the same time. Thus, for example, polyethers (in contrast to e.g., polyesters) are not attacked or decomposed by water and bacteria.

In a preferred embodiment of the present invention, the polyol is a polyalkylene oxide, and more preferably polyethylene oxide and/or polypropylene oxide.

Particularly advantageous viscoelastic properties can be achieved if polyethers having a narrow molecular weight distribution, and thus a low polydispersity are used as polymer backbones. These can be prepared, for example, by so-called double metal cyanide (DMC) catalysis. Polyethers prepared in this way are notable for a particularly narrow molecular weight distribution, a high average molecular weight, and a very small number of double bonds at the ends of the polymer chains.

In a specific embodiment of the present invention, the polyol is a polyether polyol having a polydispersity PD of less than 3, preferably less than 1.7, more preferably less than 1.5, and most preferably less than 1.3.

According to the present invention, the number average molecular weight $M_n$ of the polymer backbone of the polyol compounds is from 500 to 20,000 g/mol (daltons), preferably from 2,000 to 18,000 g/mol, and most preferably 2,000 to 12,000 g/mol, the terminal unsaturation being less than 0.05 meq/g, preferably less than 0.04 meq/g, and more preferably less than 0.02 meq/g.

These molecular weights are particularly advantageous because these polyols are readily available commercially and the resulting polyurethanes or the compositions based thereon have a good balance of viscosity (ease of processing) prior to curing and strength and elasticity after curing.

The number average molecular weight $M_n$, as well as the weight average molecular weight $M_w$, is determined by gel permeation chromatography (GPC, also known as SEC). This method is known to one skilled in the art. The polydispersity is derived from the average molecular weights $M_w$ and $M_n$. It is calculated as $PD = M_w/M_n$.

The ratio $M_w/M_n$, also referred to as "polydispersity," indicates the width of the molecular weight distribution and thus the differing degrees of polymerization of the individual chains in polydisperse polymers. For many polymers and polycondensates, the applicable polydispersity value is approximately 2. Strict monodispersity would exist for a value of 1. A low polydispersity (for example, less than 1.5) indicates a comparatively narrow molecular weight distribution and thus the specific expression of properties associated with molecular weight, for example viscosity.

The triisocyanates suitable to convert the polyol compound into a hydroxyl-terminated polyurethane prepolymer can be derived from diisocyanates. Preferably, the triisocyanates are derived from HDI, TDI, MDI, PDI or IPDI, or mixtures thereof. In particular, following triisocyanates are most preferred.

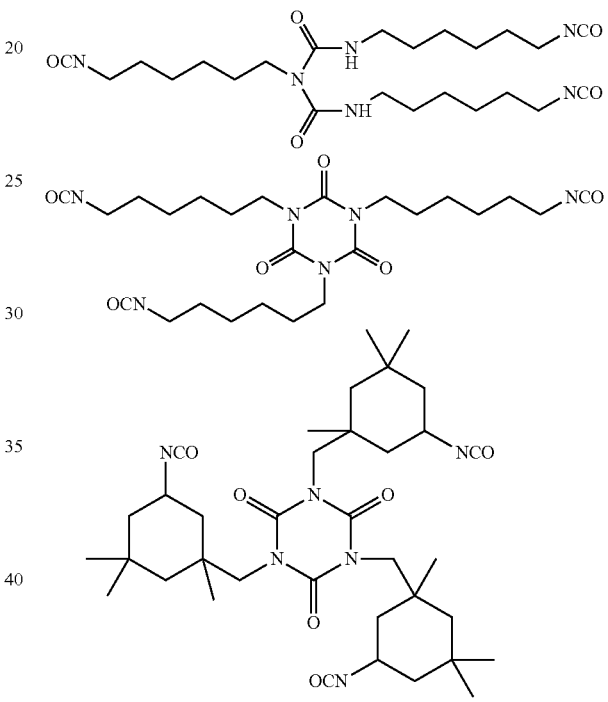

According to the present invention, a stoichiometric excess of the hydroxyl groups of the polyol compound(s) with respect to the NCO groups of the triisocyanate(s) or mixture of triisocyanates is used. The preferred molar ratio of the NCO groups to hydroxyl groups is from 0.05 to 0.45, preferably from 0.1 to 0.45, and more preferably from 0.2 to 0.45. This ensures that a polyurethane prepolymer having terminal hydroxyl groups is formed in step (a) according to the present invention.

The polyurethane prepolymer having terminal hydroxyl groups that is thereby formed is then reacted with at least one isocyanatosilane of formula (1):

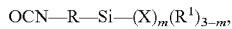

to endcap the hydroxyl groups on said prepolymer with said isocyanatosilane.

In formula (1) m is 0, 1 or 2, preferably 0 or 1.

Each $R^1$ is independently from each other a hydroxyl group, an alkoxy group having 1 to 10 carbon atoms, an acyloxy group having 1 to 10 carbon atoms, or —OCH($R^2$)COOR$^3$, wherein $R^2$ is hydrogen or an alkyl group having 1 to 4 carbon atoms and $R^3$ is a straight-chain or branched alkyl group having 1 to 8 carbon atoms.

In a preferred embodiment of the present invention, each $R^1$ is independently of each other an alkoxy or acyloxy group having 1 to 4 carbon atoms. More preferably, each $R^1$ is independently of each other a methoxy or ethoxy group, particularly a methoxy group. Methoxy and ethoxy groups, as comparatively small hydrolyzable groups with low steric bulk, are very reactive and thus enable a rapid cure even with low use of catalyst. They are therefore of particular interest for systems in which a rapid cure is desired, such as e.g. in adhesives requiring high initial adhesion. Particularly preferably, methoxy group is used. The methoxy group displays the greatest reactivity among the alkoxy groups. Silyl groups of this type can therefore be used when a particularly rapid cure is desired. Higher aliphatic residues, such as ethoxy, already bring about lower reactivity of the terminal alkoxysilyl group compared with methoxy groups and can advantageously be used to develop gradual crosslinking rates.

In another preferred embodiment of the present invention, $R^1$ is —OCH($R^2$)COO$R^3$, wherein preferably $R^2$ is methyl group and $R^3$ is a straight-chain or branched alkyl group having 1 to 4 carbon atoms.

Each X is independently from each other an optionally substituted hydrocarbon group having 1 to 10 carbon atoms, more preferably having 1 to 4 carbon atoms, which can be interrupted by at least one heteroatom. "Interrupted by at least one heteroatom" means that the main chain of a residue comprises, as a chain member, at least one atom that differs from carbon atom. Preferably, each X is independently from each other an alkyl group having 1 to 10 carbon atoms, preferably an alkyl group having 1 to 4 carbon atoms, particularly preferred methyl or ethyl.

In a preferred embodiment of the present invention, m in formula (1) has the value 0 or 1, so two or three hydroxyl- or hydrolyzable groups, preferably alkoxy groups, are present. Generally, polymers that contain di- or trialkoxysilyl groups have highly reactive linking sites, which make rapid curing, high degrees of crosslinking and thus good final strengths possible. The particular advantage of dialkoxysilyl groups is that the corresponding compositions are, after curing, softer and more elastic than systems containing trialkoxysilyl groups. They are therefore particularly suitable for utilization as sealants. In addition, they release less alcohol upon curing, and thus offer an application advantage from a physiological standpoint as well. With trialkoxysilyl groups, on the other hand, a higher degree of crosslinking can be achieved, which is particularly advantageous if a hard, solid substance is desired after curing. Trialkoxysilyl groups are moreover more reactive, i.e. crosslink more quickly, and thus decrease the quantity of catalyst required, and they have advantages in terms of "cold flow."

R is a difunctional organic group, which can be a hydrocarbon group having 1 to 12 carbon atoms, preferably an alkylene group having 1 to 6 carbon atoms, and particularly preferably an alkylene group having 1 to 3 carbon atoms. More preferably, R is a methylene, ethylene or n-propylene residue. Methylene and n-propylene residues are particularly preferably used. In particular, compounds where R is methylene exhibit high reactivity in the terminating silyl groups, which contributes to shorter curing and hardening times. If a propylene group is selected for R, these compounds then exhibit particularly high flexibility. The curing rate of formulations based on these polymers can also be influenced by means of the length of the hydrocarbon residues which form the link between the polymer backbone and silyl residue.

The isocyanatosilanes listed below are particularly suitable: 3-isocyanatopropyltrimethoxysilane, 2-isocyanatoisopropyltrimethoxysilane, 4-isocyanato-n-butyltrimethoxysilane, 2-isocyanato-1,1-dimethylethyltrimethoxysilane, 1-isocyanatomethyltrimethoxysilane, 3-isocyanatopropyltriethoxysilane, 2-isocyanato-2-methylethyltriethoxysilane, 4-isocyanatobutyltriethoxysilane, 2-isocyanato-1,1-dimethylethyltriethoxysilane, 1-isocyanatomethyltriethoxysilane, 3-isocyanatopropylmethyldimethoxysilane, 3-isocyanatopropyldimethylmethoxysilane, 3-isocyanatopropylphenylmethylmethoxysilane, 1-isocyanatomethylmethyldimethoxysilane, 3-isocyanatopropylethyldiethoxysilane, 3-isocyanatopropylmethyldiethoxysilane, 1-isocyanatomethylmethyldiethoxysilane, and mixtures thereof.

3-isocyanatopropyltrimethoxysilane, 3-isocyanatopropyltriethoxysilane, 1-isocyanatomethyltriethoxysilane, 3-isocyanatopropylmethyldimethoxysilane, 1-isocyanatomethylmethyldimethoxysilane, 1-isocyanatomethylmethyldiethoxysilane, or mixtures thereof are more particularly preferred.

In a specific embodiment, according to the present invention, aforementioned process for preparing a silylated polyurethane comprises further step of adding a catalyst. Suitable catalysts are well known. In principle, any compound that can catalyze reaction of a hydroxyl group and an isocyanato group to form a urethane bond can be used. Examples thereof include tin compounds, like tin carboxylates such as dibutyltin dilaurate (DBTL), dibutyltin diacetate, dibutyltin diethylhexanoate, dibutyltin dioctoate, dibutyltin dimethylmaleate, dibutyltin diethylmaleate, dibutyltin dibutylmaleate, dibutyltin diisooctylmaleate, dibutyltin ditridecylmaleate, dibutyltin dibenzylmaleate, dibutyltin maleate, dibutyltin diacetate, tin octaoate, dioctyltin distearate, dioctyltin dilaurate (DOTL), dioctyltin diethylmaleate, dioctyltin diisooctylmaleate, dioctyltin diacetate, and tin naphthenoate; tin alkoxides such as dibutyltin dimethoxide, dibutyltin diphenoxide, and dibutyltin diisoproxide; tin oxides such as dibutyltin oxide and dioctyltin oxide; reaction products between dibutyltin oxides and phthalic acid esters, dibutyltin bisacetylacetonate; as well as non-tin compounds. The latter include titanates such as tetrabutyl titanate and tetrapropyl titanate; organoaluminum compounds such as aluminum trisacetylacetonate, aluminum trisethylacetoacetate, and diisopropoxyaluminum ethylacetoacetate; chelate compounds such as zirconium tetraacetylacetonate and titanium tetraacetylacetonate; lead octanoate; amine compounds or salts thereof with carboxylic acids, such as butylamine, octylamine, laurylamine, dibutylamines, monoethanolamines, diethanolamines, triethanolamine, diethylenetriamine, triethylenetetramine, oleylamines, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, 2-ethyl-4-methylimidazole, and 1,8-diazabicyclo-(5,4,0)-undecene-7 (DBU), a low-molecular-weight polyamide resin obtained from an excess of a polyamine and a polybasic acid, adducts of a polyamine in excess with an epoxy, silane adhesion promoters having amino groups, such as 3-aminopropyltrimethoxysilane and N-(β-aminoethyl)aminopropylmethyldimethoxysilane, as well as compounds of potassium, iron, indium, zinc, bismuth, and copper, preferably carboxylates (salts of aliphatic carboxylic acids) or acetylacetonates of potassium, iron, indium, zinc, bismuth, or copper. Preferably, the catalyst is selected from the group consisting of compounds of potassium, iron, indium, zinc, bismuth, and copper, preferably carboxylates (salts of aliphatic carboxylic acids) or acetylacetonates of potassium, iron, indium, zinc, bismuth, or copper. $C_4$ to $C_{36}$ saturated, mono- or polyunsaturated monocarboxylic acids cab be used, in particular as aliphatic carboxylic acids. Examples thereof are: arachidic acid (n-eicosanoic acid), arachidonic acid (all-cis-5,8,11,14-eicosatetraenoic acid), behenic acid (docosanoic acid), butyric acid (butanoic acid), caproleic acid (9-decenoic acid), capric acid (n-decanoic acid), caproic acid (n-hexanoic acid), caprylic acid (n-octanoic acid), cerotic acid (hexacosanoic acid), cetoleic acid (cis-11-docosenoic acid), clupanodonic acid (all-cis-7,10,13,16,19-docosapentaenoic acid), eleostearic acid (trans-9-trans-11-cis-13-octadeca-9,11,13-trienoic acid), enanthic acid (1-hexanecarboxylic acid), erucic acid (cis-13-docosenoic acid), gadoleic acid (9-eicosenoic acid), gondoic acid (cis-11-eicosenoic acid), hiragonic acid (6,10,14-hexadecatrienoic acid), lauric acid (dodecanoic acid), lignoceric acid (tetracosanoic acid), linderic acid (cis-4-dodecenoic acid), linoleic acid ((cis,cis)-octadeca-9,12-dienoic acid), linolenic acid ((all-cis)-octadeca-9,12,15-trienoic acid), melissic acid (triacontanoic acid), montanic acid (octacosanoic acid), stearidonic acid (cis-6-cis-9-cis-12-cis-15-octadecatetraenoic acid), myristic acid (tetradecanoic acid), myristoleic acid (cis-9-tetradecenoic acid), naphthenic acid, neodecanoic acid, obtusilic acid (cis-4-decenoic acid), caprylic acid (n-octanoic acid), neooctanoic acid, oleic acid (cis-9-octadecenoic acid), palmitic acid (n-hexadecanoic acid), palmitoleic acid (cis-9-hexadecenoic acid), parinaric acid (9,11,13,15-octadecatetraenoic acid), petroselinic acid (cis-6-octadecenoic acid), physeteric acid (5-tetradecenoic acid), punicic acid (cis-9-trans-11-cis-13-octadeca-9,11,13-trienoic acid), scoliodonic acid (cis-5-cis-11-cis-14-eicosatrienoic acid), selacholeic acid (15-tetracosenoic acid), stearic acid (n-octadecanoic acid), tricosanoic acid, tsuzuic acid (cis-4-tetradecenoic acid), trans-vaccenic acid (trans-11-octadecenoic acid), palmitoleic acid (9-hexadecenoic acid). In addition to the acetylacetonates, chelates of other β-dicarbonyl compounds of potassium, iron, indium, zinc, bismuth, or copper can also be used. Acetoacetic acid alkyl esters, dialkyl malonates, benzoylacetic esters, dibenzoylmethane, benzoylacetone, and dehydroacetoacetic acid may be recited concretely.

The present invention also provides a process for preparing a silylated polyurethane comprising the following steps:
(a) reacting at least one polyol with at least one triisocyanate to form a hydroxyl-terminated polyurethane prepolymer; and
(b) reacting said polyurethane prepolymer with at least one isocyanatosilane of the formula (1)

OCN—R—Si—(X)$_m$(R$^1$)$_{3-m}$ (1)

wherein
m is 0, 1 or 2,
each R$^1$ is independently from each other a hydroxyl group, an alkoxy group having 1 to 10 carbon atoms, an acyloxy group having 1 to 10 carbon atoms, or —OCH(R$^2$)COOR$^3$, wherein R$^2$ is hydrogen or an alkyl group having 1 to 4 carbon atoms and R$^3$ is a straight-chain or branched alkyl group having 1 to 8 carbon atoms,
each X is independently from each other an optionally substituted hydrocarbon group having 1 to 10 carbon atoms, which can be interrupted by at least one heteroatom, and
R is a difunctional organic group,
to endcap the hydroxyl groups on said prepolymer with said isocyanatosilane.

The general, preferred, and particularly preferred embodiments described for the silylated polyurethane according to the present invention thus also apply to the process for preparing the silylated polyurethane according to the present invention.

The present invention also provides a curable composition, in particular an adhesive, sealant, or coating composition comprising at least one silylated polyurethane according to the invention or obtainable by the aforementioned process according to the present invention.

The adhesive, sealant, coating composition according to the present invention can also contain, in addition to the aforementioned silylated polyurethane according to the present invention, further adjuvants and additives that impart to these adhesive, sealant, coating composition improved elastic properties, improved elastic recovery, a sufficiently long processing time, a fast curing time, and low residual tack. Included among these adjuvants and additives are, for example, catalysts, plasticizers, stabilizers, antioxidants, fillers, reactive diluents, drying agents, adhesion promoters and UV stabilizers, fungicides, flame retardants, rheological adjuvants, color pigments or color pastes, and/or optionally also, to a small extent, solvents.

A "plasticizer" is understood as a substance that decreases the viscosity of the compositions and thus facilitates processability. The plasticizer is preferably selected from a fatty acid ester, a dicarboxylic acid ester, an ester of OH-group-carrying or epoxidized fatty acids, a fat, a glycolic acid ester, a benzoic acid ester, a phosphoric acid ester, a sulfonic acid ester, a trimellitic acid ester, an epoxidized plasticizer, a polyether plasticizer, a polystyrene, a hydrocarbon plasticizer, and a chlorinated paraffin, as well as mixtures of two or more thereof. Targeted selection of one of these plasticizers, or of a specific combination, can result not only in a decrease in viscosity and thus better processability, but also in further advantageous properties of the composition according to the present invention, e.g. the gelling capability of the polymers, low-temperature elasticity and/or low-temperature strength, or even antistatic properties.

In principle, phthalic acid esters can be used as a plasticizer. However, these are not preferred due to their toxicological potential.

Of the polyether plasticizers, it is preferred to use end-capped polyethylene glycols, for example polyethylene or polypropylene glycol di-$C_{1-4}$ alkyl ethers, in particular dimethyl or diethyl ethers of diethylene glycol or dipropylene glycol, as well as mixtures of two or more thereof. Also suitable as plasticizers are, for example, esters of abietic acid, butyric acid esters, acetic acid esters, propionic acid esters, thiobutyric acid esters, citric acid esters, and esters based on nitrocellulose and polyvinyl acetate, as well as mixtures of two or more thereof. Also suitable are, for example, the asymmetrical esters of adipic acid monooctyl ester with 2-ethylhexanol (Edenol DOA, Cognis Deutschland GmbH, Düsseldorf). The pure or mixed ethers of monofunctional, linear or branched $C_{4-16}$ alcohols, or mixtures of two or more different ethers of such alcohols, for example dioctyl ethers (obtainable as Cetiol OE, Cognis Deutschland GmbH, Düsseldorf), are also suitable as plasticizers. Likewise, suitable in the context of the present invention as plasticizers are diurethanes, which can be manufactured e.g. by reacting diols having OH terminal groups with nnonofunctional isocyanates, by selecting the stoichiometry so that substantially all the free OH groups react completely. A further method for manufacturing diurethanes involves reacting monofunctional alcohols with diisocyanates, such that all the NCO groups react as completely as possible.

Plasticizers can be additionally used in the composition at between 0 and 40, by preference between 0 and 20 wt %, based on the total weight of the composition.

"Stabilizers" for purposes of this invention are to be understood as antioxidants, UV stabilizers, or hydrolysis stabilizers. Examples thereof are the commercially usual sterically hindered phenols and/or thioethers and/or substituted benzotriazoles and/or amines of the hindered amine light stabilizer (HALS) type. It is preferred in the context of the present invention if a UV stabilizer that carries a silyl group, and that is incorporated into the end product upon crosslinking or curing, is used. The products Lowilite 75, Lowilite 77 (Great Lakes, USA) are particularly suitable for this purpose. Benzotriazoles, benzophenones, benzoates, cyanoacrylates, acrylates, sterically hindered phenols, phosphorus, and/or sulfur can also be added.

The composition according to the present invention can contain up to approximately 2 wt %, by preference approximately 1 wt % stabilizers. In addition, the composition according to the present invention can further contain up to approximately 7 wt %, in particular up to approximately 5 wt % antioxidants.

The catalysts that can be used are all known compounds that can catalyze hydrolytic cleavage of the hydrolyzable groups of the silane groupings, as well as subsequent condensation of the Si—OH group to yield siloxane groupings (crosslinking reaction and adhesion promotion function). Examples thereof are titanates such as tetrabutyl titanate and tetrapropyl titanate, tin carboxylates such as dibutyltin dilaurate (DBTL), dibutyltin diacetate, dibutyltin diethylhexanoate, dibutyltin dioctoate, dibutyltin dimethylmaleate, dibutyltin diethylmaleate, dibutyltin dibutylmaleate, dibutyltin diiosooctylmaleate, dibutyltin ditridecylmaleate, dibutyltin dibenzylmaleate, dibutyltin maleate, dibutyltin diacetate, tin octaoate, dioctyltin distearate, dioctyltin dilaurate (DOTL), dioctyltin diethylmaleate, dioctyltin diisooctylmaleate, dioctyltin diacetate, and tin naphthenoate; tin alkoxides such as dibutyltin dimethoxide, dibutyltin diphenoxide, and dibutyltin diisoproxide; tin oxides such as dibutyltin oxide and dioctyltin oxide; reaction products between dibutyltin oxides and phthalic acid esters, dibutyltin bisacetylacetonate; organoaluminum compounds such as aluminum trisacetylacetonate, aluminum trisethylacetoacetate, and diisopropoxyaluminum ethylacetoacetate; chelate compounds such as zirconium tetraacetylacetonate and titanium tetraacetylacetonate; lead octanoate; amine compounds or salts thereof with carboxylic acids, such as butylamine, octylamine, laurylamine, dibutylamines, monoethanolamines, diethanolamines, triethanolamine, diethylenetriamine, triethylenetetramine, oleylamines, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, 2-ethyl-4-methylimidazole, and 1,8-diazabicyclo-(5,4,0)-undecene-7 (DBU), a low-molecular-weight polyamide resin obtained from an excess of a polyamine and a polybasic acid, adducts of a polyamine in excess with an epoxy, silane adhesion promoters having amino groups, such as 3-aminopropyltrimethoxysilane and N-(β-aminoethyl)aminopropylmethyldimethoxysilane.

The catalyst, preferably mixtures of several catalysts, can be used in a quantity from 0.01 to approximately 5 wt % based on the entire weight of the composition.

The composition according to the present invention can additionally contain fillers. Suitable here are, for example, chalk, lime powder, precipitated and/or pyrogenic silicic acid, zeolites, bentonites, magnesium carbonate, diatomite, alumina, clay, talc, titanium oxide, iron oxide, zinc oxide, sand, quartz, flint, mica, glass powder, and other ground mineral substances. Organic fillers can also be used, in particular carbon black, graphite, wood fibers, wood flour, sawdust, cellulose, cotton, pulp, cotton, wood chips, chopped straw, chaff, ground walnut shells, and other chopped fibers. Short fibers such as glass fibers, glass filament, polyacrylonitrile, carbon fibers, Kevlar fibers, or polyethylene fibers can also be added. Aluminum powder is likewise suitable as a filler.

The pyrogenic and/or precipitated silicic acids advantageously have a BET surface area from 10 to 90 $m^2/g$. When they are used, they do not cause any additional increase in the viscosity of the composition according to the present invention, but do contribute to strengthening the cured composition.

It is likewise conceivable to use pyrogenic and/or precipitated silicic acids having a higher BET surface area, advantageously 100 to 250 $m^2/g$, in particular 110 to 170 $m^2/g$, as a filler. Because of the greater BET surface area, the same effect, e.g. strengthening the cured composition, is achieved with a smaller weight proportion of silicic acid. Further substances can thus be used to improve the composition according to the present invention in terms of different requirements.

Also suitable as fillers are hollow spheres having a mineral shell or a plastic shell. These can be, for example, hollow glass spheres that are obtainable commercially under the trade names Glass Bubbles®. Plastic-based hollow spheres, e.g. Expancel® or Dualite®, are described e.g. in EP 0 520 426 B1. They are made up of inorganic or organic substances and each have a diameter of 1 mm or less, preferably 500 µm or less.

Fillers that impart thixotropy to the composition are preferred for many applications. Such fillers are also described as rheological adjuvants, e.g. hydrogenated castor oil, fatty acid amides, or swellable plastics such as PVC. In order to be readily squeezable out of a suitable dispensing apparatus (e.g. a tube), such compositions possess a viscosity from 3000 to 150,000, preferably 40,000 to 80,000 mPas, or even 50,000 to 60,000 mPas.

The fillers can be used by preference in a quantity from 1 to 80 wt %, by preference from 5 to 60 wt %, based on the total weight of the composition.

Examples of suitable pigments are titanium dioxide, iron oxides, or carbon black.

In order to enhance shelf life even further, it is often advisable to further stabilize the composition according to the present invention with respect to moisture penetration using drying agents. A need occasionally also exists to lower the viscosity of the adhesive or sealant according to the present invention for specific applications, by using a reactive diluent. All compounds that are miscible with the adhesive or sealant with a reduction in viscosity, and that possess at least one group that is reactive with the binder, can be used as reactive diluents.

The following substances can be used, for example, as reactive diluents: polyalkylene glycols reacted with isocyanatosilanes (e.g. Synalox 100-50B, Dow), carbamatopropyltrimethoxysilane, alkyltrimethoxysilane, alkyltriethoxysilane, methyltrimethoxysilane, methyltriethoxysilane, and vinyltrimethoxysilane (VTMO Geniosil XL 10, Wacker), vinyltriethoxysilane, phenyltrimethoxysilane, phenyltriethoxysilane, octyltrimethoxysilane, tetraethoxysilane, vinyldimethoxymethylsilane (XL12, Wacker), vinyltriethoxysilane (GF56, Wacker), vinyltriacetoxysilane (GF62, Wacker), isooctyltrimethoxysilane (IO Trimethoxy), isooctyltriethoxysilane (IO Triethoxy, Wacker), N-trimethoxysilylmethyl-O-methyl carbamate (XL63, Wacker), N-dimethoxy(methyl)silylmethyl-O-methyl carbamate (XL65, Wacker), hexadecyltrimethoxysilane, 3-octanoylthio-1-propyltriethoxysilane, and partial hydrolysates of the aforementioned compounds.

Also, usable as reactive diluents are the following polymers of Kaneka Corp.: MS S203H, MS S303H, MS SAT 010, and MS SAX 350.

Silane-modified polymers that are derived, for example, from the reaction of isocyanatosilane with Synalox grades can likewise be used.

In the same manner, the silylated polyurethanes according to the present invention can be used in a mixture with usual polymers or prepolymers known per se, optionally with concurrent use of the aforementioned reactive diluents, fillers, and further adjuvants and additives. "Usual polymers or prepolymers" can be selected in this context from polyesters, polyoxyalkylenes, polyacrylates, polymethacrylates, or mixtures thereof; these can be free of groups reactive with siloxane groups, but optionally can also comprise alkoxysilyl groups or hydroxyl groups.

A plurality of the aforementioned silane-functional reactive diluents have at the same time a drying and/or adhesion-promoting effect in the composition. These reactive diluents may be used in quantities between 0.1 and 15 wt %, by preference between 1 and 5 wt %, based on the total weight of the composition.

Also suitable as adhesion promoters, however, are so-called tackifying agents, such as hydrocarbon resins, phenol resins, terpene-phenolic resins, resorcinol resins or derivatives thereof, modified or unmodified resin acids or resin esters (abietic acid derivatives), polyamines, polyaminoamides, anhydrides, and anhydride-containing copolymers. The addition of polyepoxide resins in small quantities can also improve adhesion on many substrates. The solid epoxy resins having a molecular weight of over 700, in finely ground form, are then preferably used for this. If tackifying agents are used as adhesion promoters, their nature and quantity depend on the adhesive/sealant composition and on the substrate onto which it is applied. Typical tackifying resins (tackifiers) such as, for example, terpene-phenolic resins or resin acid derivatives, may be used in concentrations between 5 and 20 wt %; typical adhesion promoters such as polyamines, polyaminoamides, or phenolic resins or resorcinol derivatives may be used in the range between 0.1 and 10 wt %, based on the total weight of the composition.

The present invention also provides the use of the silylated polyurethane according to the present invention as an adhesive, sealant, coating composition, or for the production thereof.

In principle in the present invention, all features listed within the context of the present text, particularly the embodiments, proportional ranges, components and other features of the composition according to the invention, of the method according to the invention and of the use according to the invention identified as preferred and/or special, can be implemented in all possible and not mutually exclusive combinations, with combinations of features identified as preferred and/or special also being regarded as preferred and/or special.

EXAMPLES

Example 1 (Ex 1)

Manufacture of a Silylated Polyurethane (Use of Triisocyanate):

384.02 g (33.88 mmol) of polypropylene ether polyol (Acclaim 12200, hydroxyl value=9.90) were dried in a 500 ml three-necked flask at 80-90° C. under vacuum. Under a nitrogen atmosphere, 0.28 g of bismuth neodecanoate (Borchi Kat 315) were added with stirring. Then, 2.52 g (4.52 mmol) of triisocyanate (Tolonate HDT-LV) were added (NCO/OH ratio=0.2) with stirring. The mixture was left for one hour at 80-95° C. The conversion was accomplished with NCO monitoring, and as soon as the theoretical NCO value of the prepolymer had been reached titrimetrically (% NCO=0), 13.18 g (62.69 mmol) of 3-isocyanato-propyltrimethoxysilane (Geniosil GF 40) were added with stirring and the mixture was left for a further hour at 80-95° C. (% NCO=0.00 to 0.09). A star-shaped polymer was obtained. The resulting polymer was stored in a moisture-proof glass vessel under a nitrogen atmosphere before being processed further into a curable composition. The viscosity was 41,200 mPas.

Comparative Example 1 (Comp 1)

Manufacture of a Silylated Polyurethane (Use of Diisocyanate):

A similar procedure to Example 1 was carried out except that HDI was used instead of triisocyanate. The viscosity was 28,200 mPas. Details are summarized in Table 1.

Example 2 (Ex 2)

Manufacture of a Silylated Polyurethane (Use of Triisocyanate):

A similar procedure to Example 1 was carried out except that NCO/OH ratio=0.4 and Acclaim 4200 (hydroxyl value=29.50) was used instead of Acclaim 12200. The viscosity was 78,600 mPas. Details are summarized in Table 1.

Comparative Example 2 (Comp 2)

Manufacture of a Silylated Polyurethane (Use of Diisocyanate):

A similar procedure to Example 2 was carried out except that HDI was used instead of triisocyanate. The viscosity was 10,600 mPas. Details are summarized in Table 1.

TABLE 1

|  | Ex 1 | Comp 1 | Ex 2 | Comp 2 |
|---|---|---|---|---|
| Acclaim 12200 | 384.02 g (33.88 mmol) | 385.33 g (34.00 mmol) |  |  |
| Acclaim 4200 |  |  | 357.13 g (93.90 mmol) | 364.02 g (95.71 mmol) |
| Borchi Kat 315 | 0.28 g | 0.28 g | 0.28 g | 0.28 g |
| Tolonate | 2.52 g |  | 13.95 g |  |

TABLE 1-continued

|  | Ex 1 | Comp 1 | Ex 2 | Comp 2 |
|---|---|---|---|---|
| HDT-LV | (4.52 mmol) |  | (25.04 mmol) |  |
| HDI |  | 1.16 g<br>(6.80 mmol) |  | 6.52 g<br>(38.28 mmol) |
| NCO/OH ratio | 0.2 | 0.2 | 0.4 | 0.4 |
| Geniosil GF 40 | 13.18 g<br>(62.69 mmol) | 13.23 g<br>(62.90 mmol) | 28.64 g<br>(136.15 mmol) | 29.18 g<br>(138.78 mmol) |
| % NCO after adding Geniosil GF 40 | 0.00-0.09 | 0.00-0.09 | 0.00-0.25 | 0.00-0.25 |
| Viscosity | 41,200 mPas | 28,200 mPas | 78,600 mPas | 10,600 mPas |

Determination of the Viscosity of the Polymer:

The viscosity values were determined using Brookfield viscometer (DV-II+ Pro), spindle 7, 20 rpm, at 23° C.

Examples A-F

Manufacture of Compositions Comprising a Silylated Polyurethane:

Each prepared silylated polyurethane according to above examples was heated for 24 hours at 23° C. and then 0.35 g of N-(2-Aminoethyl)-3-aminopropyltrimethoxysilane (Geniosil GF 91) and 0.14 g of DOTL or DBU were added to 34.51 g of each of the prepared polymer. This mixture was homogenized twice for 60 seconds at 2700 rpm in a Speed-Mixer (DAC 150 FC).

The time to form a skin (skin over time/SOT) and mechanical strength (tensil strength and elongation) were determined for the abovementioned mixtures. The results are summarized in Table 2 below. DOTL was used in preparing Examples A to D and DBU was used as a tin-free catalyst in preparing Examples E to F.

TABLE 2

|  | A | B | C | D | E | F |
|---|---|---|---|---|---|---|
| Silylated Polyurethane | Ex 1 | Comp 1 | Ex 2 | Comp 2 | Ex 1 | Comp 1 |
| SOT | 14 min | 16 min | 22 min | 1 h 21 min | 33 min | 44 min |
| Tensil Strength (N/mm²) | 0.88 | 0.85 | 1.10 | 0.89 | 0.80 | 0.76 |
| Elongation (%) | 57.98 | 61.75 | 43.28 | 39.38 | 55.53 | 53.88 |

Determination of the Skin-Over Time (SOT) and Mechanical Strength (Tensil Strength and Elongation):

The aforementioned mixtures were homogenized and applied in a frame (50×130×2 mm). Each mixture was evenly distributed so that the frame can be completely filled. A thin polymer film was thereby obtained. The time to form a skin (skin-over time/SOT) was determined for these compositions using a tool which has a rounded spatula at the tip (150×5 mm). The tip of the spatula was gently contacted with the surface of the polymer film every 1 to 5 minutes and removed carefully. The SOT was measured once no more residue of the formulation remains on the spatula when removing it from the surface of the polymer film. Then, the resulting string must be removed from the spatula without residue. The polymer film returned to its original shape. In examining the SOT a different part of the surface of the polymer film must be used every time. The test was performed at 23° C. and 50% relative humidity.

After being stored for 7 days (23° C., 50% relative humidity), four specimens were prepared from the polymer film and punched using a Mader press (APK T3-5-40) and a punching tool unit according to DIN 53504-S3A. The mechanical data were determined by reference to DIN 53504:2009-10. Each specimen was set to the initial test position using a pre-load of 0.05 MPa and a speed rate of 40 mm/min. Actual measurement was done using a speed rate of 50 mm/min.

The examples show that the mixtures A, C, and E containing a silylated polyurethane according the present invention (Examples 1 to 2), show reasonable viscosity, exhibit significantly shorter SOT than mixtures comprising a silylated polyurethane according to the Comparative Examples 1 to 2, while having good mechanical strength (tensil strength and elongation). In addition, comparison of Examples E and F shows that even in case of using non-tin catalyst the mixture containing a silylated polyurethane according the present invention also exhibits short SOT and good mechanical properties.

The invention claimed is:

1. A silylated polyurethane having a viscosity of about 41,200 mPas to about 78,600 mPas and obtained by a process comprising the following steps:
   (a) reacting at least one polyol with at least one triisocyanate to form a hydroxyl-terminated polyurethane prepolymer; and
   (b) reacting the hydroxyl-terminated polyurethane prepolymer with at least one isocyanatosilane of formula (1) to endcap the hydroxyl groups on the hydroxyl-terminated polyurethane prepolymer with the isocyanatosilane, $$OCN-R-Si-(X)_m(R^1)_{3-m} \quad (1)$$

wherein
   m is 0, 1 or 2,
   each $R^1$ is independently from each other a hydroxyl group, an alkoxy group having 1 to 10 carbon atoms, an acyloxy group having 1 to 10 carbon atoms, or $-OCH(R^2)COOR^3$, wherein $R^2$ is hydrogen or an alkyl group having 1 to 4 carbon atoms and $R^3$ is a straight-chain or branched alkyl group having 1 to 8 carbon atoms,
   each X is independently from each other an optionally substituted hydrocarbon group having 1 to 10 carbon atoms, which can be interrupted by at least one heteroatom, and
   R is a difunctional organic group.

2. The silylated polyurethane according to claim 1, wherein a molar ratio of the NCO groups of the triisocyanate to hydroxyl groups of the polyol is from 0.05 to 0.45.

3. The silylated polyurethane according to claim 1, wherein said polyol is a polyether polyol.

4. The silylated polyurethane according to claim 1, wherein said polyol has a number average molecular weight of from 500 to 20,000 g/mol.

5. The silylated polyurethane according to claim 1, wherein said triisocyanate is derived from HDI, TDI, MDI, PDI, IPDI, or mixtures thereof.

6. The silylated polyurethane according to claim 1, wherein said isocyanatosilane is selected from the group consisting of 3-isocyanatopropyltrimethoxysilane, 2-isocyanatoisopropyltrimethoxysilane, 4-isocyanato-n-butyltrimethoxysilane, 2-isocyanato-1,1-dimethylethyltrimethoxysilane, 1-isocyanatomethyltrimethoxysilane, 3-isocyanatopropyltriethoxysilane, 2-isocyanato-2-methylethyltriethoxysilane, 4-isocyanatobutyltriethoxysilane, 2-isocyanato-1,1-dimethylethyltriethoxysilane, 1-isocyanatomethyltriethoxysilane, 3-isocyanatopropylmethyldimethoxysilane, 3-isocyanatopropyldimethylmethoxysilane, 3-isocyanatopropylphenylmethylmethoxysilane, 1-isocyanatomethylmethyldimethoxysilane, 3-isocyanatopropylethyldiethoxysilane, 3-isocyanatopropylmethyldiethoxysilane, 1-isocyanatomethylmethyldiethoxysilane, and mixtures thereof.

7. The silylated polyurethane according to claim 1, wherein said process comprises further step of adding a catalyst.

8. An adhesive, sealant, or coating composition comprising the silylated polyurethane according to claim 1.

9. An adhesive, sealant, or coating composition comprising:
a silylated polyurethane: and
optionally one or more additives selected from catalyst, plasticizer, stabilizer, antioxidant, filler, reactive diluent, drying agent, adhesion promoter, UV stabilizer, fungicide, flame retardant, rheological adjuvant, color pigment, color paste, and solvent;
wherein the composition has a viscosity of 40,000 mPas to 150,000 mPas and the silylated polyurethane is the reaction product of a mixture comprising:
(a) the hydroxyl terminated polyurethane prepolymer reaction product of a mixture comprising at least one polyol and at least one triisocyanate; and
(b) at least one isocyanatosilane of formula (1)

$$\text{OCN-R-Si-(X)}_m(R^1)_{3-m} \qquad (1)$$

wherein
m is 0, 1 or 2,
each $R^1$ is independently from each other a hydroxyl group, an alkoxy group having 1 to 10 carbon atoms, an acyloxy group having 1 to 10 carbon atoms, or $-\text{OCH}(R^2)\text{COOR}^3$, wherein $R^2$ is hydrogen or an alkyl group having 1 to 4 carbon atoms and $R^3$ is a straight-chain or branched alkyl group having 1 to 8 carbon atoms,
each X is independently from each other an optionally substituted hydrocarbon group having 1 to 10 carbon atoms, which can be interrupted by at least one heteroatom, and
R is a difunctional organic group.

* * * * *